United States Patent [19]

Kanazawa et al.

[11] Patent Number: 5,020,619

[45] Date of Patent: Jun. 4, 1991

[54] REAR WHEEL STEERING DEVICE FOR A VEHICLE

[75] Inventors: Hirotaka Kanazawa; Hiroshi Ohmura; Atsuo Tomoda; Akihiro Furuzawa; Takashi Nakashima; Masao Hideshima, all of Hiroshima, Japan

[73] Assignee: Mazda Motor Corporation, Hiroshima, Japan

[21] Appl. No.: 466,543

[22] Filed: Jan. 17, 1990

[30] Foreign Application Priority Data

Jan. 18, 1989 [JP] Japan .................................... 1-9484
Jan. 18, 1989 [JP] Japan .................................... 1-9487
Jan. 23, 1989 [JP] Japan .................................... 1-14292

[51] Int. Cl.⁵ .......................... B62D 5/06; B62D 7/00
[52] U.S. Cl. .................................. 180/140; 180/79.1; 180/142; 364/424.05
[58] Field of Search ................ 180/140, 142, 79.1; 280/91; 364/424.05

[56] References Cited

U.S. PATENT DOCUMENTS

| | | | |
|---|---|---|---|
| 4,412,594 | 11/1983 | Furukawa et al. | 180/140 |
| 4,679,808 | 7/1987 | Ito et al. | 280/91 |
| 4,679,808 | 7/1987 | Ito et al. | 280/91 |

FOREIGN PATENT DOCUMENTS

| | | |
|---|---|---|
| 0198450 | 10/1986 | European Pat. Off. . |
| 3532247 | 3/1986 | Fed. Rep. of Germany . |
| 3608420 | 9/1986 | Fed. Rep. of Germany . |
| 2083422 | 3/1982 | United Kingdom . |
| 2151997 | 7/1985 | United Kingdom . |

OTHER PUBLICATIONS

Research Center for Traffic Safety and Pollution, Ministry of Transport (Japan), Lecture on Kinetic Characteristic of Four-Wheel Steering Vehicles with Rear Wheel Steering by Yaw Rate Feedback (9th Lecture Meeting, 1979).

*Primary Examiner*—Mitchell J. Hill
*Attorney, Agent, or Firm*—Thompson, Hine and Flory

[57] ABSTRACT

A rear wheel steering device for a vehicle has a steering control mechanism which steers rear wheels of the vehicle on the following formula:

$$TG\theta_R = -K_F\theta_F + K_R \cdot V \cdot \dot{\psi}$$

where
$TG\theta_R$: target steering angle of rear wheels
$\theta_F$: steering angle of front wheels
$V$: vehicle speed
$\dot{\theta}$: yaw rate
$K_F$, $K_R$: coefficients determined by the properties of vehicle.

To achieve slip angle $\beta = 0$, the device further includes a vehicle condition detecting mechanism which detects various conditions of the vehicle, and a changing mechanism being connected with the steering control mechanism and the vehicle condition detecting mechanism for changing at least one of the coefficients $K_F$, $K_R$ based on the conditions of the vehicle.

7 Claims, 10 Drawing Sheets $\theta_F$ (deg)

$\theta_R$ (deg)

$\dot{\psi}$ (deg/s)

$\beta$ (deg)

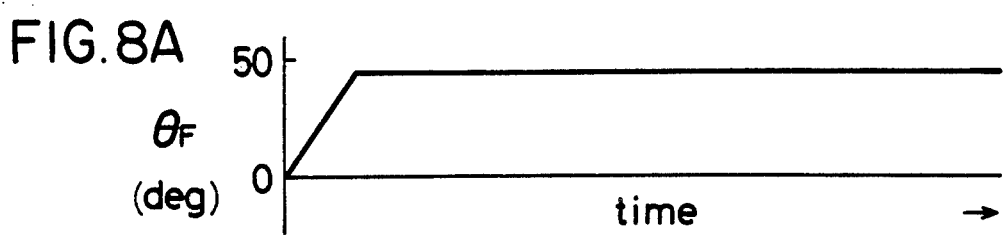
FIG.8A θ_F (deg)
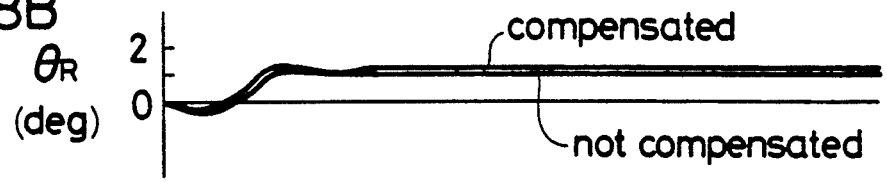
FIG.8B θ_R (deg)
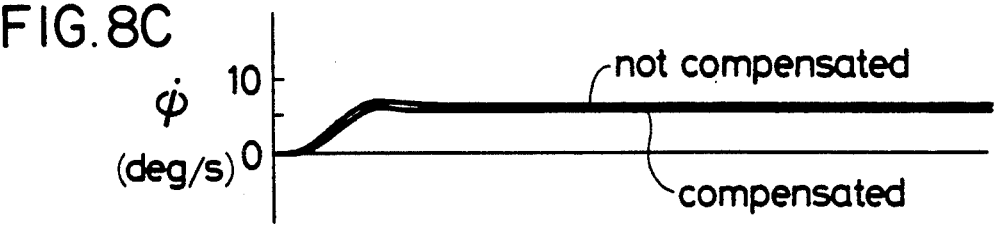
FIG.8C φ̇ (deg/s)
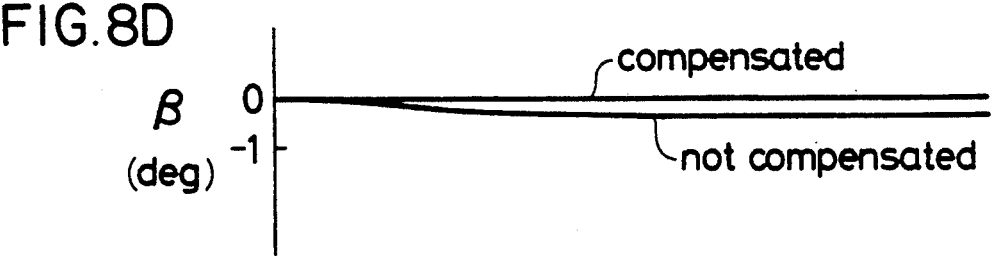
FIG.8D β (deg)

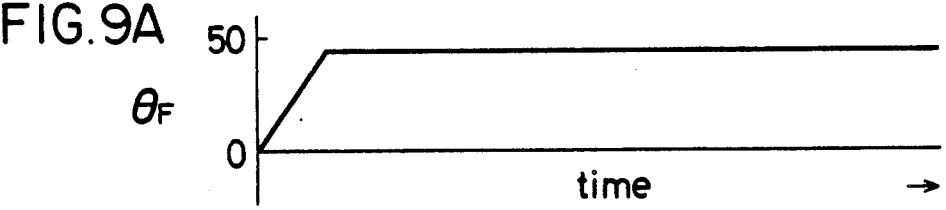
FIG.9A $\theta_F$
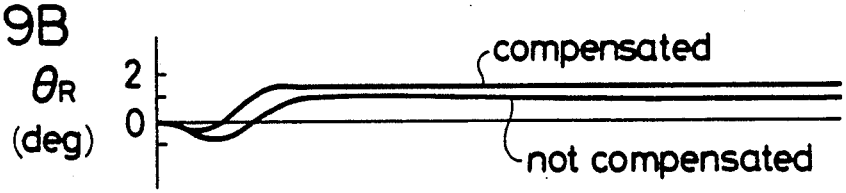
FIG.9B $\theta_R$ (deg)
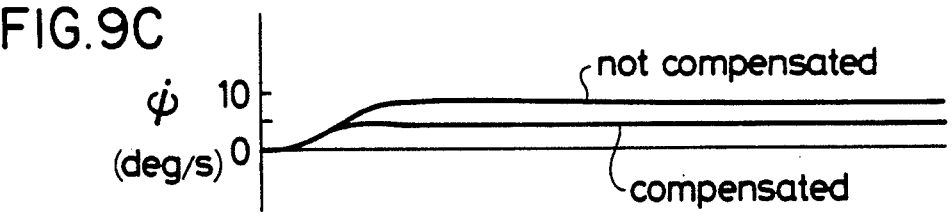
FIG.9C $\dot{\psi}$ (deg/s)
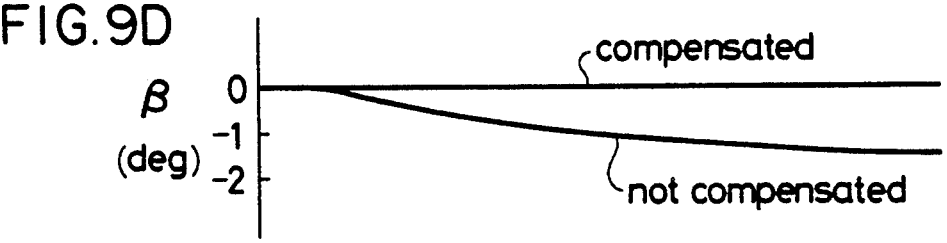
FIG.9D $\beta$ (deg)

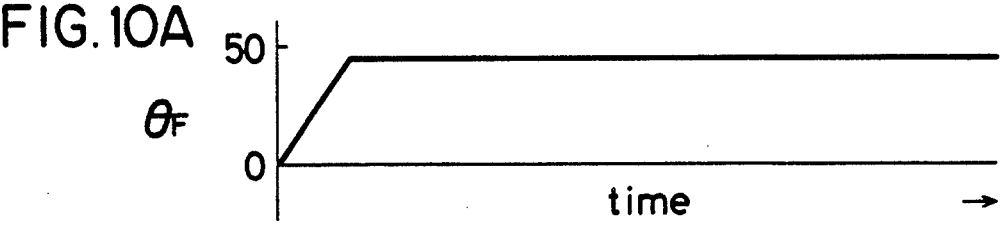
FIG.10A $\theta_F$
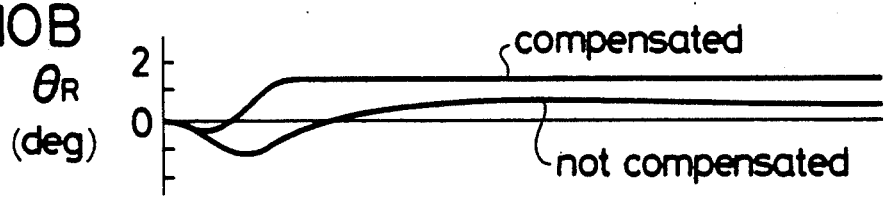
FIG.10B $\theta_R$ (deg)
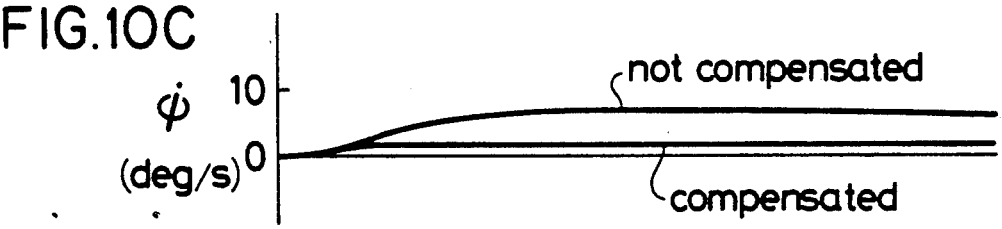
FIG.10C $\dot{\psi}$ (deg/s)
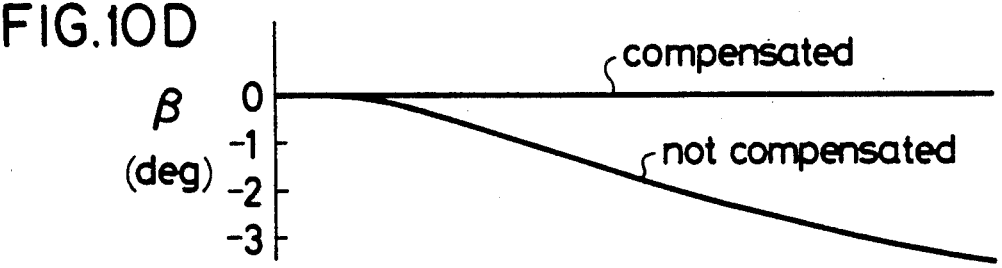
FIG.10D $\beta$ (deg)

REAR WHEEL STEERING DEVICE FOR A VEHICLE

BACKGROUND OF THE INVENTION

The present invention relates to a rear wheel steering device for a vehicle.

Conventionally, a four-wheel steering device for a vehicle which steers rear wheels in accordance with a vehicle speed and a steering angle of front wheels has been known in the art. In this device, the rear wheels are steered in the opposite direction at a low speed, and in the same direction at a high speed to the front wheels according to the steered angle thereof.

In this prior art, no problem occurs when turning a corner slowly with a gradual steering of the steering wheel at the initiation of a turn since necessary yaw rate (yaw angular velocity) is attained due to the difference of the steering angles between the front and the rear wheels. However, problems arise when turning the steering wheel abruptly since, with the rear wheels in the same orientation as the front wheels at a high speed, the vehicle moves in a diagonal direction and vehicle yaw rate is restricted. As a result, slip angle $\beta$ formed between the orientation of the vehicle and the moving direction thereof does not become 0 degrees, which will lead to a failure to meet the driver's desire to turn the vehicle.

Desirably, at the initial stage of steering in such a case, first the orientation of the vehicle should be changed, and then the rear wheels should be steered in the same orientation as the front wheel to stabilize the vehicle condition, thereby constantly achieving a slip angle $\beta = 0$.

To this end, a method of to steering the rear wheels according to the following formula has been proposed:

$$TG\theta_R = -K_F\theta_F + K_R \cdot V \cdot \dot{\psi} \tag{1}$$

where
$TG\theta_R$: target steering angle of rear wheels
$\theta_F$: steering angle of front wheels
$V$: vehicle speed
$\dot{\psi}$: yaw rate
$K_F$, $K_R$: constants determined by vehicle properties, for example, vehicle weight based on wheels, center of gravity balance of the vehicle.

In the above formula, $K_F$ and $K_R$ are determined by the following equation:

$$K_F = C_1/C_2$$
$$K_R = WV/g - (C_2 l_2 - C_1 l_1)/V$$
$$\approx W/C_2 g$$

$C_1$, $C_2$: cornering capacity
$W$: weight
$l_1$: distance between gravity center of vehicle and axle of front wheels
$l_2$: distance between gravity center of vehicle and axle of rear wheels.

The formula shows that the steering angle of the front wheels functions as an element to steer the rear wheels in the direction opposite to the front wheels while a vehicle speed V and a yaw rate function as an element to steer the rear wheels in the same direction as the front wheels. Accordingly, at a low speed, the direction of the rear wheels become opposite to that of the front wheels since the value of the second term of the formula is small due to the low vehicle speed V. On the contrary, at a high speed, the direction of the rear wheels coincide with that of the front wheels since the value of the second term of the formula is large due to the increase in a vehicle speed V and a yaw rate. However, at the initial portion of the turn, the direction of the rear wheels is opposite to that of the front wheels because the value of the second term of the formula is yet small due to lower yaw rate during the initial stage of the turn.

As disclosed in the U.S. Pat. No. 4,412,594, a device which steers rear wheels in accordance with the output from a yaw rate sensor to compensate for disturbances such as side wind has been known in the art.

In the above formula, $K_F$ and $K_R$ are defined as constants. However, using these values as constants makes it difficult to control the rear wheels. For example, if, during a low speed, the steered angle of the front wheels is approximately at 35 degrees and the rear wheels are steered at the same angles as the front wheels, the vehicle will make a small excessively sharp turn with a resultant swerve of the rear end of the vehicle. Furthermore, drivers accustomed to driving 2-wheel steering cars wherein rear wheels are not steered may feel uncomfortable and uneasy in driving four-wheel steering cars.

According to the above formula, when the wheels are locked, for example, by the abrupt braking, vehicle speed V becomes 0 and the direction of the rear wheels becomes opposite to that of the front wheels. However, since at the initial stage of braking, vehicle speed V is not actually 0, the vehicle will be in an unstable state. In addition, during sudden deceleration, sudden decrease in the vehicle speed V causes the vehicle to move toward the unstable direction or an undesired direction for the driver, with a resultant failure to achieve improved control of the vehicle. Further, during acceleration, the same problem occurs when the wheel spin is occurring.

Above mentioned formula further involves the problem when practically applied to the rear wheel steering device. That is, during sudden acceleration and deceleration, the value of the first term of the formula becomes large, and consequently the element for controlling the rear wheels into the opposite direction to the front wheel becomes large. As a result, the vehicle will be placed in the unstable condition. In detail, when the vehicle speed V becomes 0 due to sudden braking, for example, the value of the second term of the formula becomes 0, and therefore the rear wheels will consistently be steered in the opposite direction. That means the rear wheels are in the direction opposite to the front wheels when the control of the vehicle is recovered in the driver's hands, which is not desirable transiently. Furthermore, even during the low speed running at the initial stage of the acceleration, the value of the first term of the formula should be small to achieve the stability of the vehicle condition since the driver does not require the turn of the wheels at that stage.

On the other hand, at a low speed, the value of the second term of the formula should be small. This is because when driving at a low speed, for example, while garaging a car, vehicle speed fluctuates substantially due to frequent change in the degree of acceleration, and relatively high vehicle yaw rate is generated due to the large steering angle. Under such circumstances, extent of degrees to which the rear wheels are steered opposite to the front wheels decreases to the contrary of the driver's desire to make a small turn. In addition, the driver may feel uncomfortable because of the frequent changes of the steering angle.

When practically applied to the rear wheel steering device of a vehicle, the method of controlling the rear wheels based on a vehicle yaw rate has an advantage over the conventional two-wheel steering device under a certain condition. That is the stable controllability of the vehicle under the condition that the change of speed of the vehicle yaw rate is within the fixed range while the rear wheels are securely steerable. However, the disadvantage lies in the difficulty of recovering the control of the rear wheels, once it is lost. For instance, according to the result of the test conducted to determine when the control of rear wheels is lost at the time of exceeding the peak of the cornering power $C_P$ (refer to FIG. 17) during the turn under the same road condition, four-wheel steering vehicle lost its control at a higher speed while two-wheel steering vehicle lost its control at relatively low speed. This indicates that the four-wheel steering vehicle lose its controllability while the kinetic energy of the vehicle is high, resulting in the subsequent difficulty of recovering the control. Accordingly, slip angle $\beta = 0$ cannot be obtained.

SUMMARY OF THE INVENTION

It is therefore an object of the present invention to provide a rear wheel steering device wherein slip angle $\beta = 0$ is always achieved in every mode of running including high speed mode, and easy driving at low speed can be promised by preventing the swerving of the rear end of the vehicle.

The present invention includes steering control means for steering rear wheels in accordance with the following formula:

$$TG\theta_R = -K_F\theta_F + K_R \cdot V \cdot \psi$$

where
$TG\theta_R$: target steering angle of rear wheel
$\theta_F$: steering angle of front wheel
$V$: vehicle speed
$\psi$: vehicle yaw rate
$K_F$, $K_R$: coefficients determined by the properties of vehicle.

The present invention further comprises vehicle detecting means for detecting various conditions of the vehicle, changing means connected with the steering control means and the vehicle condition detecting means for changing at least one of the coefficients $K_F$ and $K_R$ in accordance with various conditions of the vehicle such as a vehicle speed, a friction coefficient of the road surface, a loading weight and a steering angle. Since at least one of the coefficients $K_F$ and $K_R$ is modified in accordance with various conditions of the vehicle, such as a vehicle speed, a friction coefficient of the road surface and a loading weight of the vehicle, a target steering angle of the rear wheels can be set at the optimum value.

In the present invention, the vehicle condition detecting means is connected with a vehicle speed sensor and the changing means incrementally changes at least the coefficient $K_F$ between the coefficients $K_F$ and $K_R$ with the increase in vehicle speed V. Since changing only the coefficient $K_F$ results in the excessively large value of the second term of the formula at a low speed, $K_R$ may also be increased with the increase in a vehicle speed. In this way, at least one coefficient $K_F$ between the coefficients $K_F$ and $K_R$ are increased as a vehicle speed increases. This means that at lower vehicle speed V, the rear steering angle becomes small and the steering characteristics becomes similar to that of two-wheel steering vehicles and the rear end swerving of the vehicle is restricted, thereby relieving the driver who is accustomed to driving two-wheel steering vehicles of uncomfortableness driving four-wheel steering vehicles.

Further in the present invention, the vehicle condition detecting means detects the acceleration and deceleration of the vehicle and the changing means decreases the coefficient $K_F$ or increases the coefficient $K_R$ in accordance with the acceleration and deceleration of the vehicle. Accordingly, since the coefficient $K_F$ is decreased or the coefficient $K_R$ is increased according to the acceleration and deceleration of the vehicle, the steering direction of the rear wheels becomes the same as that of the front wheels, thus compensating the tendency of the vehicle to go into the unstable direction during acceleration and deceleration and directing the vehicle in the stable direction.

The present invention further comprises vehicle state detecting means for detecting certain states of the vehicle and deleting means for receiving the output from the vehicle state detecting means and, under the certain state, commanding the steering control means to delete either one of the first and the second terms of the formula to calculate only the other. Therefore, since, under the certain state, the deleting means commands the steering control means to delete either one of the first and the second terms of the formula and to calculate only the other, desirable steering for the driver can be realized.

In the present invention, the vehicle state detecting means is connected with acceleration and deceleration detecting means for detecting a sudden accelerated or decelerated state of the vehicle, and the deleting means commands the steering control means at the time of sudden acceleration or deceleration to control the rear wheels in accordance with the formula wherein the first term is deleted. Consequently, the vehicle is guided to the stable direction because the rear wheels are steered in the same direction as the front wheels due to deletion deleting the first term of the formula.

Furthermore, in the invention, the vehicle state detecting means is linked with a vehicle speed sensor for detecting speed of the vehicle, and the deleting means commands the steering control means at the time of a slow speed to control the rear wheel in accordance with the formula wherein the second term is deleted. This deletion of the second term of the formula at a low speed leads to the guidance of the rear wheels into the opposite direction in relation to the front wheels with the resultant capability of the vehicle to make small and sharp turns.

For the purpose of constantly achieving slip angle $\beta = 0$ by predicting the range where cornering power $C_P$ decreases, the invention further comprises acceleration detecting means for detecting the change of the yaw rate $\psi$ or lateral G, and compensating means for compensating the steering angle of the rear wheels obtained from the steering control means when the degree of acceleration outputted from the degree of acceleration detecting means is larger than the fixed degree so as to increase the steering angle of the rear wheels by a fixed degree toward the same direction as the front wheels. In this way, while predicting the range wherein the cornering power $C_P$ decreases (refer to FIG. 17) With the increase in slip angle $\beta=0$, based on the change of the yaw rate $\dot\psi$ or the lateral G detected from the degree increases the steering angle of the rear wheels by a fixed degree toward the same direction as the front wheels, i.e. the stable direction, to compensate the rear wheel steering angle obtained from the steering control means.

The above and other objects and novel features of the present invention will become apparent upon reading the following detailed description with reference to the accompanying drawing.

BRIEF DESCRIPTION OF THE DRAWINGS

The accompanying drawings show a preferred embodiment of the present invention, in which;

FIGS. 8 through 10 are time charts respectively showing the effects of a loading weight and a friction coefficient of road condition;

DESCRIPTION OF THE PREFERRED EMBODIMENTS

Figure 1:
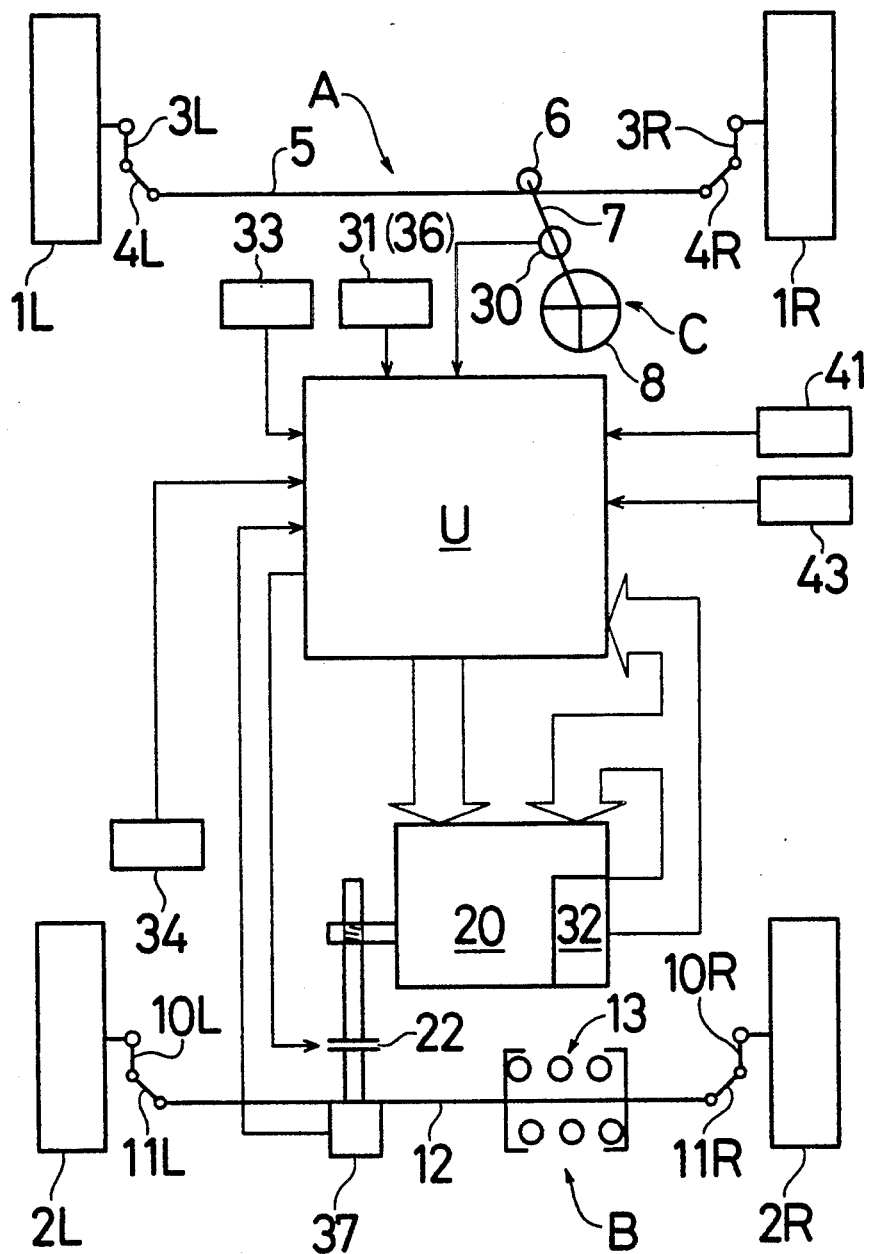
FIG. 1 is a view of an overall construction of a rear wheel steering device of a vehicle.

Referring to the drawings, description is made below of preferred embodiments of the present invention.

In FIG. 1 showing the overall construction of the rear wheel steering device of a vehicle, reference numerals 1L and 1R designate respectively left and right front wheels, and 2L and 2R designate respectively left and right rear wheels. Left and right front wheels 1L and 1R are connected by means of a front wheel steering mechanism A, and left and right rear wheels 2L and 2R are connected by means of a rear wheel steering mechanism B.

The front wheel steering mechanism A comprises a pair of knuckle arms 3L and 3R, a pair of tie rods 4L and 4R, and a relay rod 5 which connects the pair of left and right tie rods 4L and 4R. Connected to the front wheel steering mechanism A is a steering mechanism C which is of rack and pinion type. A pinion 6 constituting the steering mechanism C is connected with a steering wheel 8 through a shaft 7.

With the above construction, when the steering wheel 8 is steered to the right, the relay rod 5 travels to the left direction in FIG. 1, and then the knuckle arms 3L and 3R are turned clockwise in FIG. 1 in accordance with the steered displacement of the steering wheel 8, i.e. a steering angle of the steering wheel. Likewise, when the steering wheel 8 is steered to the left, left and right front wheels 1L and 1R are turn to the left in accordance with the steered displacement of the steering wheel 8.

Like the front wheel steering mechanism A, the rear wheel steering mechanism B comprises a pair of left and right knuckle arms 10L and 10R, a pair of left and right tie rods 11L and 11R, and a relay rod 12 which connects the pair of left and right tie rod 11L and 11R. The relay rod 12 is provided with neutrally holding means 13.

Figure 2:
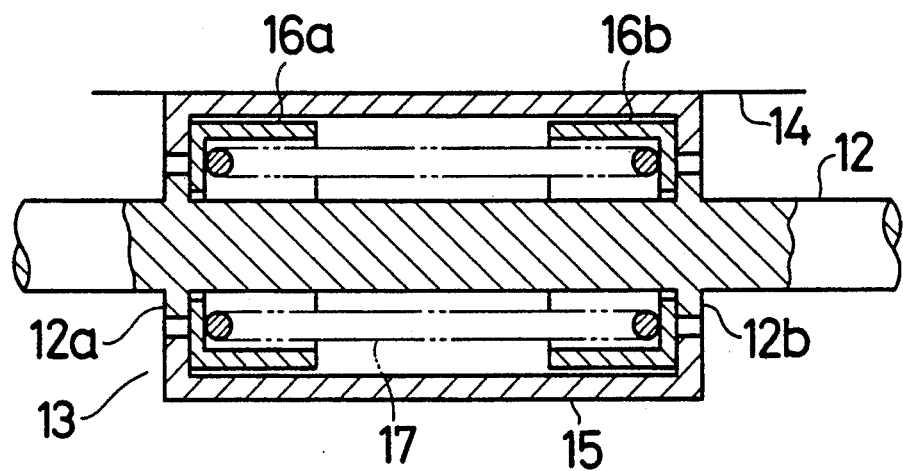
FIG. 2 is an enlarged sectional view of neutrally holding means.

As shown in detail in FIG. 2, neutrally holding means 13 has a casing 15 which is fixed in a vehicle body 14. Accomodated inside the casing 15 are a pair of spring bearings 16a and 16b wherein a compression spring 17 is inserted therebetween. The relay rod 12, passing through the casing 15, has a spaced pair of flange portions 12a and 12b. These spaced flange portions 12a and 12b accomodate the spring bearings 16a and 16b. The relay rod 12 is constantly supported in the neutral position by the compression spring 17. The compression spring 17 must be stiff enough for withstanding the side force generated during cornering maneuver.

The rear wheel steering mechanism B is connected with a servo motor 20 which is a power source for steering the rear wheels 2L and 2R. Provided in a connecting mechanism between the relay rod 12 and the servo motor 20 is a clutch 22 by which the communication between the servo motor 20 and the rear wheel steering mechanism B is mechanically cut when necessary.

With the construction described above, while the clutch 22 is in the connected state, forward or reverse rotation of the servo motor 20 makes the relay rod 12 to move toward the left or the right in FIG. 1. Thus the knuckle arms 10L and 10R are turned clockwise or anticlockwise on the pivotal center thereof in accordance with the rotation of the servo motor 20.

On the other hand, while the clutch 22 is in the disconnected state, the rear wheels 2L and 2R are urged to return and are held in the neutral position by the neutrally holding means. In other words, when the clutch 22 is cut, only the front wheels 1L and 1R are steered, which means the vehicle two-wheel steering.

The rear wheels are controlled based on the following formula:

$$TG\theta_R = -K_F\theta_F + K_R \cdot V \cdot \dot\psi \qquad (1)$$

where
$TG\theta_R$: target steering angle of rear wheel
$\theta_F$: steering angle of front wheel
V: vehicle speed
$\dot\psi$: yaw rate.

Figure 3:
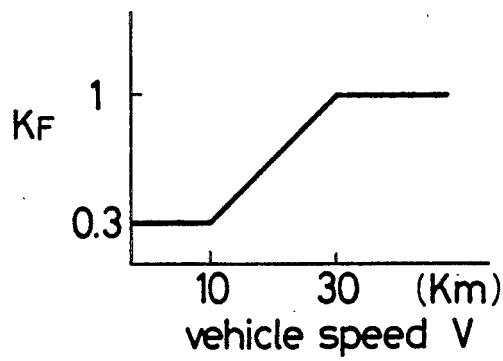
FIGS. 3 and 4 are explanatory drawings showing the changes of $K_F$ and $K_R$.
Figure 4:
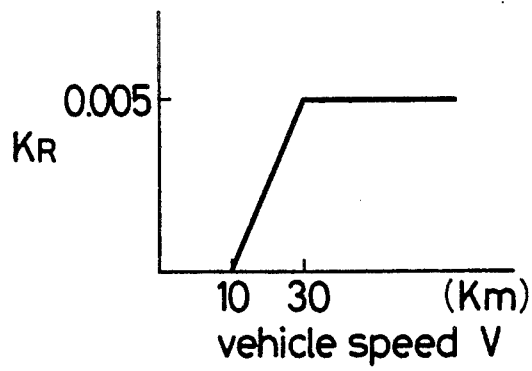

Coefficients $K_F$ and $K_R$ are variables which are modified in relation to the vehicle speed. For example, as shown in FIG. 3, $K_F$ remains at 0.3 when the vehicle speed V is within 10 km/h. After the vehicle speed V exceeds 10 km/h, $K_F$ gradually increases to become 1 with the increase in vehicle speed V. However, as shown in FIG. 4, $K_R$ begins increasing gradually when the vehicle speed V exceeds 10 km/h, and then it reaches and remains at 0.005 when the vehicle speed is approximately 30 km/h.

Figure 13:
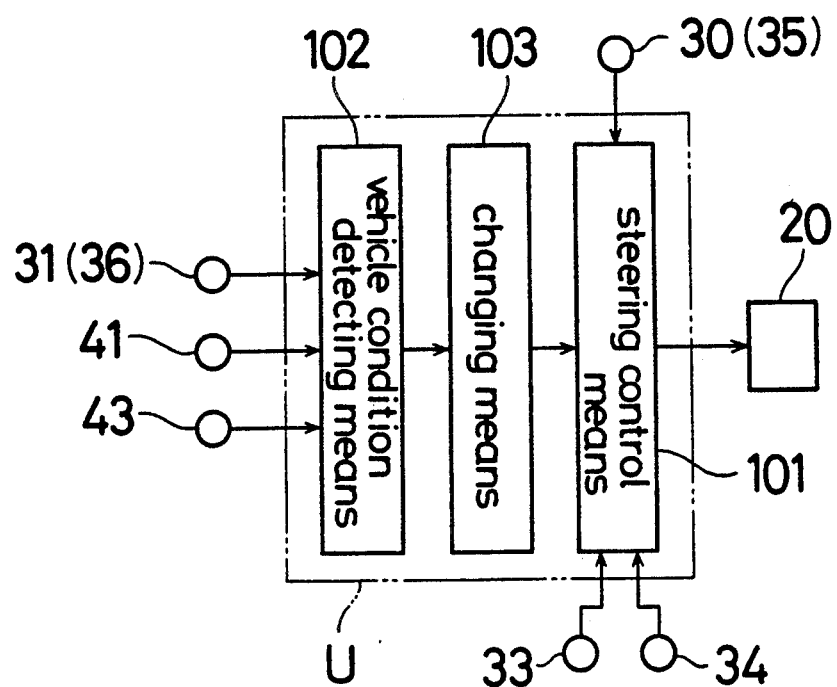
FIG. 13 is a block diagram of a control unit.

To control the changes of $K_F$ and $K_R$, as shown in FIG. 13, a control unit U is provided with steering control means 101 for steering the rear wheels based on the formula (1), vehicle condition detecting means 102 for detecting the vehicle speed V as one of the various conditions of the vehicle, and changing means 103 connected with the steering control means 101 and the vehicle condition detecting means 102 for changing the coefficients $K_F$ and $K_R$ in accordance with the various conditions of the vehicle. Coefficients $K_F$ and $K_R$ in the formula are modified, for example, in accordance with a pattern shown in FIGS. 3 and 4, by the changing means based on the vehicle speed.

More specifically, as shown in FIG. 1, signal produced from a steering wheel angle sensor 30, a vehicle speed sensor 31, an encoder 32 for detecting the rotation position of the servo motor 20, and a front lateral G sensor 33 and a rear lateral G sensor 34 are sent to the control unit U. Then the control unit U, while varying the coefficients $K_F$ and $K_R$ in accordance with the vehicle speed, calculate a target rear wheel steering angle $TG\theta_R$ in accordance with the above formula based on the steering wheel angle $\theta_F$ (steering angle of the front wheel), the vehicle speed V and the yaw rate $\dot{\psi}$. Then, the control signal corresponding to the required steering degree of the rear wheels is sent to the servo motor 20. While the encoder 32 monitors whether the servo motor 20 operates properly, the rear wheels 2L and 2R are steered under the feedback control.

The above control is performed in dual modes to ensure the fail-safe mechanism.

Figure 5:
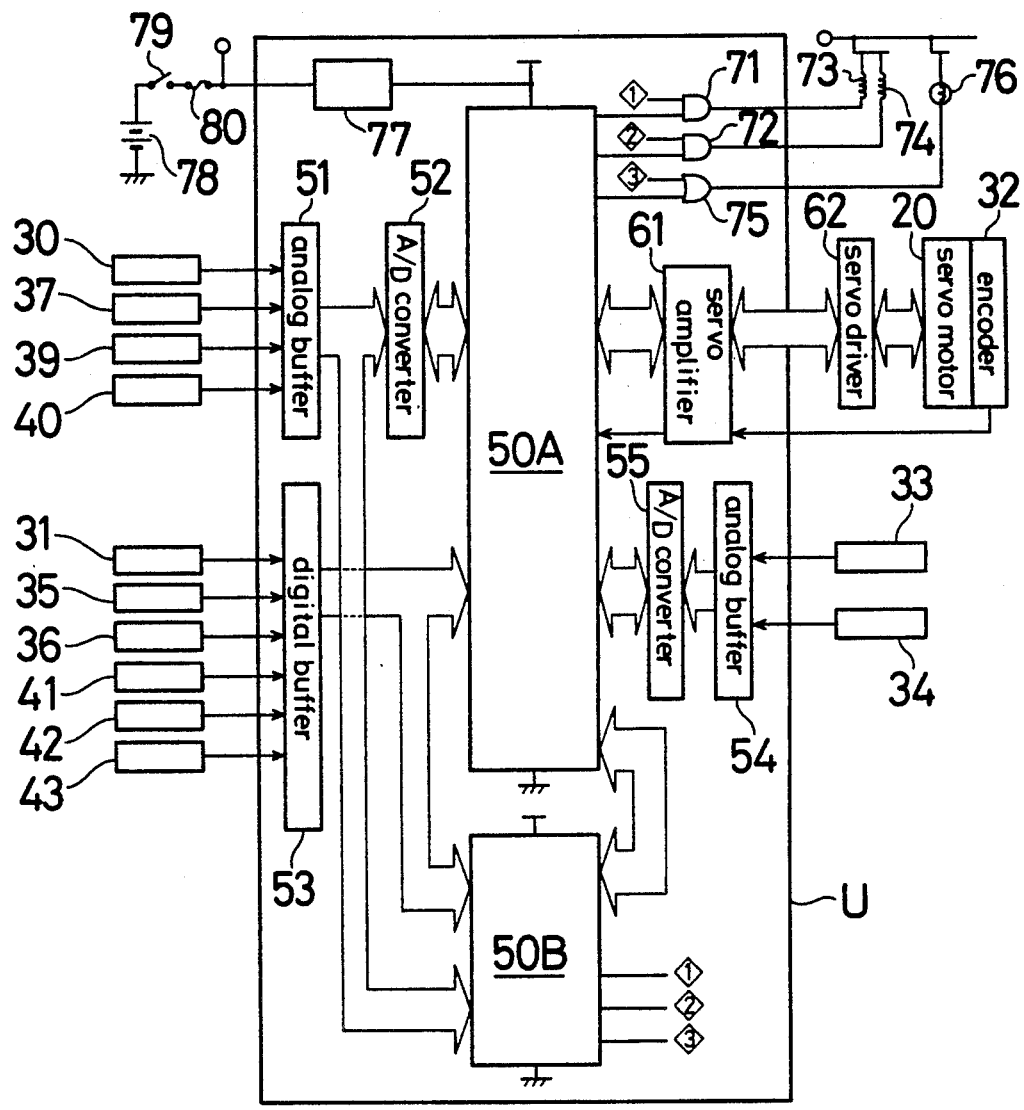
FIG. 5 is a block diagram of a control system.
Figure 6A:
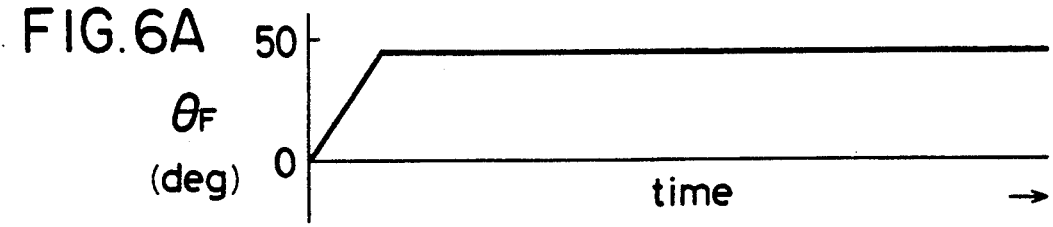
FIG. 6 is a time chart showing comparison between four-wheel steering of the present invention and two-wheel steering.
Figure 6B:
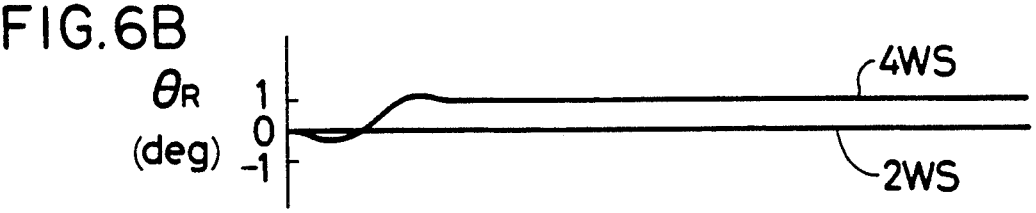
Figure 6C:
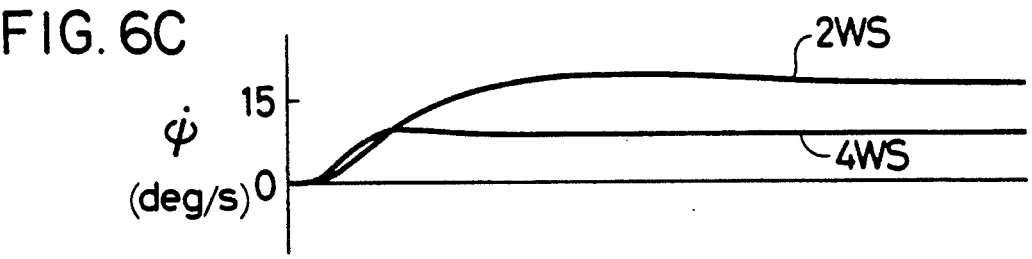
Figure 6D:
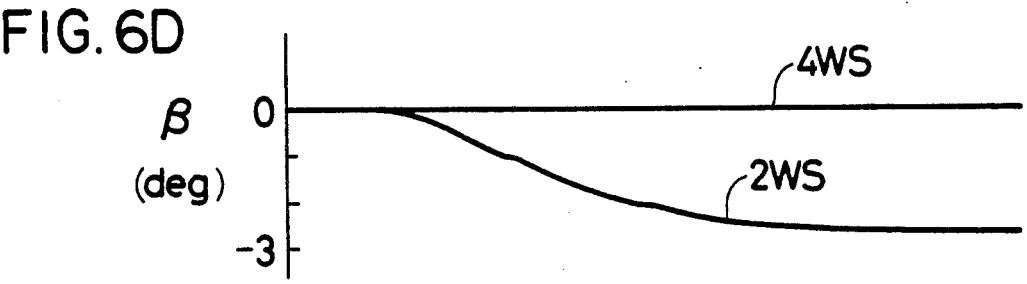

As shown in FIG. 5, a front wheel steering angle sensor 35 is added to the steering angle sensor 30 of the steering wheel, a vehicle speed sensor 36 is added to the vehicle speed sensor 31, and a rear wheel steering angle sensor 37 for detecting the mechanical displacement of the members disposed close to the relay rod 12 away from the clutch 22 is added to the encoder 32. The rear wheels are steered only when each pair of these corresponding sensors 30, 31, 32, 35, 36, and 37 outputs the same value. For example, among sensors 30 to 32, 35 to 37, when the vehicle speed detected by the vehicle speed sensor 31 and the vehicle speed detected by the vehicle speed sensor 36 differ each other, this is interpreted as the occurance of the failure and the control of fail-mode is performed to hold the rear wheels 2L and 2R in the neutral position.

The lateral G sensors 33 and 34 are located in the front and the rear side of the vehicle on the center axis thereof with the center of gravity therebetween. These sensors 33 and 34 are used for detecting the yaw rate. Using the output of the lateral G sensors 33 and 34, present yaw rate $\dot{\psi}_n$ is calculated based on the following formula:

$$\dot{\psi}_n = \dot{\psi}_{4-1} + (G_F - G_R) \, t/l$$

where
$\dot{\psi}_{n-1}$: preceding yaw rate
$G_F$: output of front lateral G sensor
$G_R$: output of rear lateral G sensor
t: interval of measurement
l: distance between lateral G sensors.

A yaw rate sensor for directly detecting the yaw rate $\dot{\psi}$ can be added instead of the lateral G sensor.

For various controls, signals produced from a vehicle height sensor 39, a rain drop sensor 40, a brake switch 41, a reverse switch 42 and an acceleration switch 43 are sent to the control unit U. Although it is not shown in the drawings, a signal indicating power generation is sent from L terminal of the alternator.

The vehicle height sensor 39 is to detect the height of the vehicle, thus indirectly detecting the loading weight. The rain drop sensor 40 is to detect rain drops, thus indirectly detecting the friction coefficient $\mu$ of the road surface. The brake switch 41 outputs "ON" signal when the brake pedal is applied. The reverse switch 42 outputs "ON" signal when the shift lever is put in the reverse position. The acceleration switch 43 outputs "ON" signal when the rate of change of the acceleration exceeds a certain value.

Control is carried out by two interconnected controllers, a main controller 50A and a sub-controller 50B. Each controller 5OA and 50B receives signals sent from sensors 30, 37, 39, 40 and the terminal L of the alternator by means of an analog buffer 51 and an A/D converter 52. They also receive signals sent from sensors 31, 35, and 36, and switches 41, 42 and 43 by means of a digital buffer 53. Further the main controller 50A receives signals sent from the lateral sensors 33 and 34 by means of an another analog buffer 54 and an A/D converter 55.

Signal processed in the main controller 50A is sent to the servo motor 20 by means of a servo amplifier 61 and a servo driver 62 in order to turn the rear wheels at the target steering angle. The degree of rotation of the servo motor 20 is detected by the encoder 32. In turn, signal produced from the encoder 32 is sent to the main controller 50A by means of the servo amplifier Sl in such a way that the servo motor 20 is feedback controlled.

The clutches 73 and 74 are connected to enable the steering of the rear wheels only when the signals produced respectively from the controllers 50A and 50B are compared in the AND circuits 71 and proved to be the same value and 72. Furthermore, signals are compared also in the OR circuit 75 to light the warning lamp 78 when there is a disparity between the signals.

Steering control of the rear wheels begins when the signal produced from L terminal of the alternator becomes "Hi".

In FIG. 5, reference numeral designates a voltage control circuit having 5 V regulator and re-setting the main controller 5OA in case of abnormality. Reference numeral 78 designates a battery, 79 designates an ignition switch, and 80 designates a fuse.

With the aforementioned construction, as shown in FIG. 6, although the steering angle $\theta_F$ of the steering wheel changes in the same manner with the passage of time in both the four-wheel steering (4WS) and the two-wheel steering (2WS), the four-wheel steering of the present invention has a smaller yaw rate $\dot{\psi}$ and an almost 0 degree of slip angle $\beta$ compared with the two-wheel steering (the steering angle of the rear wheels=0).

The vehicle condition detecting means 102 of the main control unit U is connected with the acceleration switch 43 and the brake switch 41 in order to detect the state of acceleration and deceleration. Accordingly, coefficients $K_F$ and $K_R$ are varied according to the acceleration and deceleration as well as the vehicle speed. In detail, when the condition detecting means 102 detects the acceleration due to the signal from the acceleration switch 43, the changing means 103 compensates the coefficient $K_R$ to be $K_R + \alpha$ by adding the compensation value $\alpha$. The changing means 103 gradually increases the compensation value $\alpha$ (refer to FIG.

Figure 7:
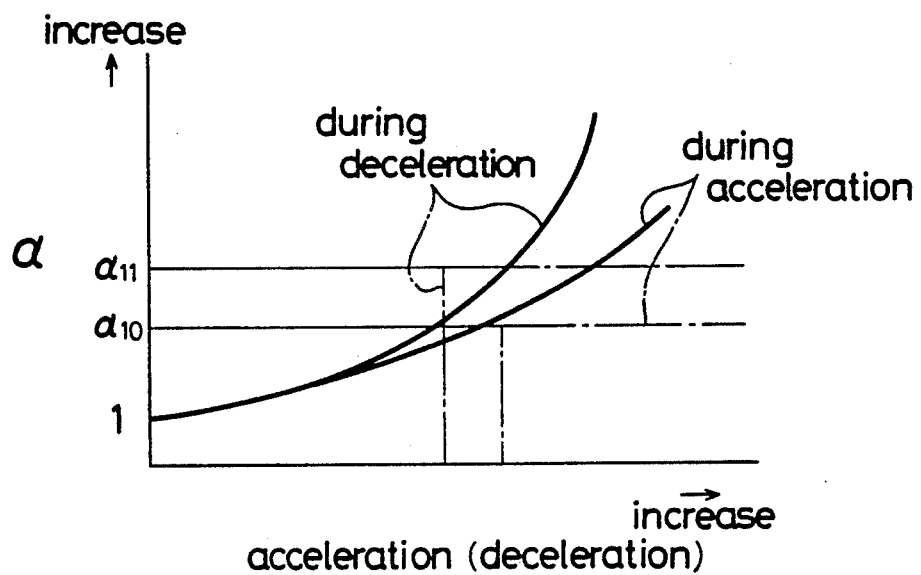
FIG. 7 shows compensaion values in the state of acceleration and deceleration.

7) according to the degree of acceleration so as to guide the vehicle toward the stable direction, thus satisfying the driver's requirement during acceleration. The same theory can be applied during deceleration. However, it is preferable to increase the rate of changing the degree of the compensation value compared with the case of acceleration. As indicated by the chain line in FIG. 7, the coefficient $K_R$ may be increased by a fixed compensation values $\alpha_{10}$ and $\alpha_{11}$ ($\alpha_{10} < \alpha_{11}$) after the degree of acceleration and deceleration exceeds a certain point. When modifying the coefficient $K_F$, compensation value should be small to the contrary of the case of the constant $K_R$.

The above described embodiment modifies the coefficients $K_F$ and $K_R$ in accordance with the speed, and acceleration and deceleration of the vehicle. However, in addition to the vehicle speed acceleration and deceleration, the coefficients may be varied in accordance with the loading weight, the friction coefficient of the road surface and steering angle speed of the steering wheel.

For example, as shown in FIG. 8 when the loading weight (for instance, about 300 kg) increases, slip angle $\beta$ increases as time passes and does not become 0 if adopting the formula without compensation. But, if the compensation is made of the loading weight W, slip angle $\beta$ becomes substantially 0 as shown in FIG. 8.

It is understood when comparing FIG. 9 ($\mu=0.5$) and FIG. 10 ($\mu=0.2$), the absolute value of slip angle $\beta$ nears almost 0 when compensated in relation to the friction coefficient $\mu$, while the absolute value of slip angle $\beta$ increases when adopting the formula without compensation.

No delay can be seen in $\theta_F$ since it is the steering angle of the steering wheel. However, the yaw rate $\dot{\psi}$ involves delay as a motor system. Since $\theta$ functions as an element inducing the opposite direction of the rear wheels to the front wheels and $\dot{\psi}$ functions as an element inducing the same direction, time delay of $\dot{\psi}$ to $\theta_F$ exercises adverse effect on the stability of driving. Accordingly, $K_F$ and $K_R$ must be multiplied by compensation values $\gamma_1$ and $\gamma_2$ which varies according to the steering angle speed of the steering wheel to make the compensated values of the coefficients, $K_F \cdot \gamma_1$ and $K_R \cdot \gamma_2$.

Figure 11:
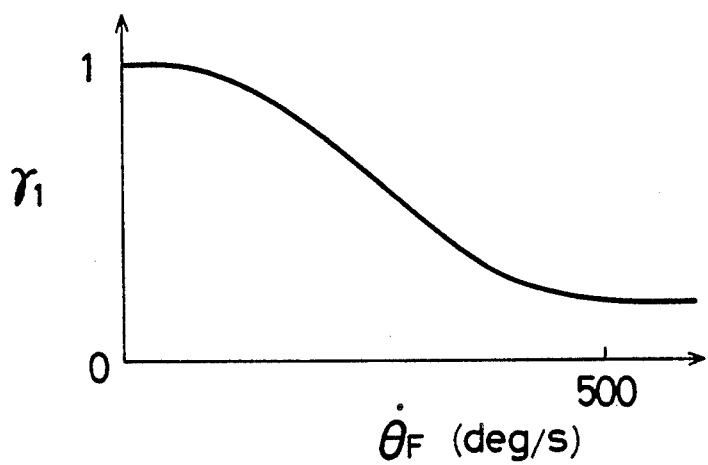
FIGS. 11 and 12 are explanatory drawings showing compensation values in relation to steering angle speed of the steering wheel.
Figure 12:
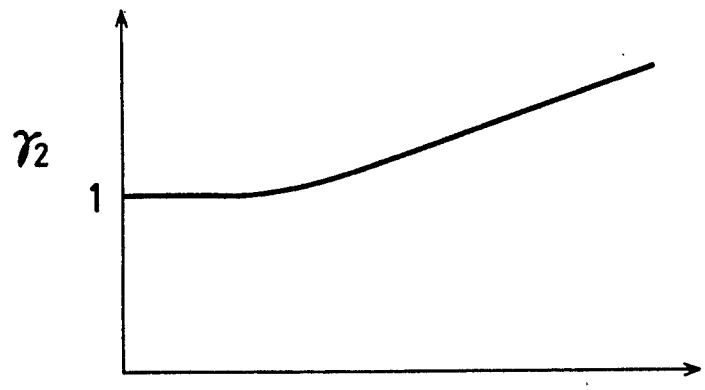

In other words, the compensation value $\gamma_1$ decreases the value of the coefficient $K_F$ as the steering angle speed $\dot{\theta}_F$ of the steering wheel increases. As a result, until the yaw rate becomes high enough, the rear wheels are restricted from being abruptly steered into the direction opposite to the front until the yaw rate $\dot{\psi}$ becomes sufficient enough (refer to FIG. 11). When the steering angle speed $\dot{\theta}_F$ is high, the compensation value $\gamma_2$ increases the value of the coefficient $K_R$ to make up for the delay in the increase of the yaw rate (refer to FIG. 12).

Figure 14:
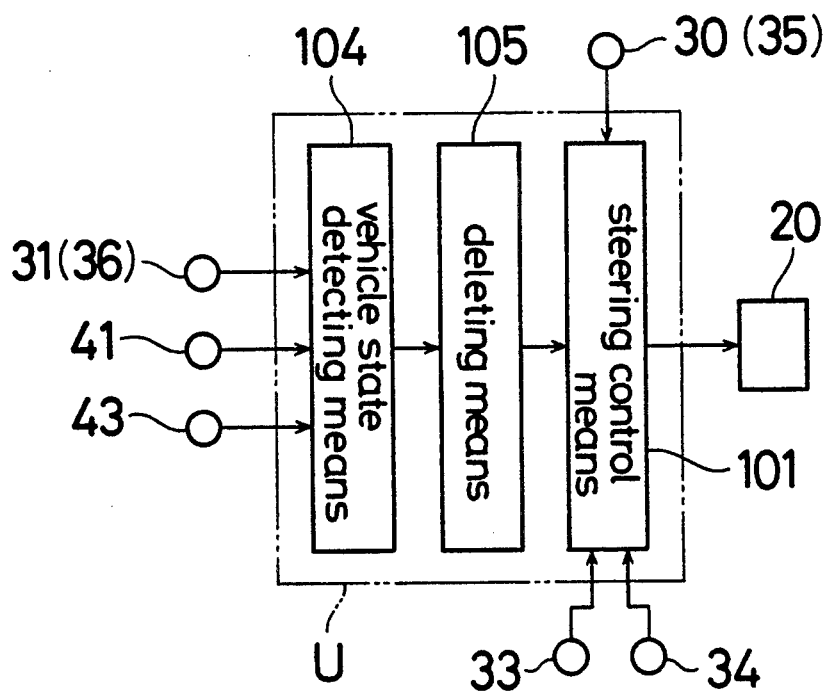
FIG. 14 is a block diagram of a control unit in the alternate embodiment.

Without depending on the complex arithmetic operation to meet the required control, as shown in FIG. 14, vehicle state detecting means 104 and deleting means 105 can be added to the steering control means which steers the rear wheels based on the formula (1). the vehicle state detecting means 104 detects the state of low speed or acceleration and deceleration of the vehicle. The deleting means 105 receives the output from the vehicle state detecting means 104, and in accordance with the state of a low speed or acceleration and deceleration of the vehicle, commands the steering control means 101 to delete either one of the first and the second terms of the formula (1) to carry out operation only in the other.

When the first term of the formula is deleted in the case of acceleration and deceleration, the formula will be as follows:

$$TG\theta_R = K_R \cdot V \cdot \dot{\psi}$$

According to this formula, the rear wheels are consistently steered in the same direction as the front wheels, thus achieving the stable state of the vehicle. In this formula, a vehicle speed immediately before the acceleration or deceleration will be adopted as the vehicle speed V. When the second term of the formula (1) is deleted in the case of a low speed running of the vehicle, the formula will be as follows:

$$TG\theta_R = -K_F \theta_F$$

According to this formula, the rear wheels are consistently steered in the opposite direction to the front wheels. This means that the degree of the steering angle of the rear wheels is determined so as to be proportional to that of the steering angle of the front wheels. Thus, the vehicle can make a small and sharp turn.

Figure 15:
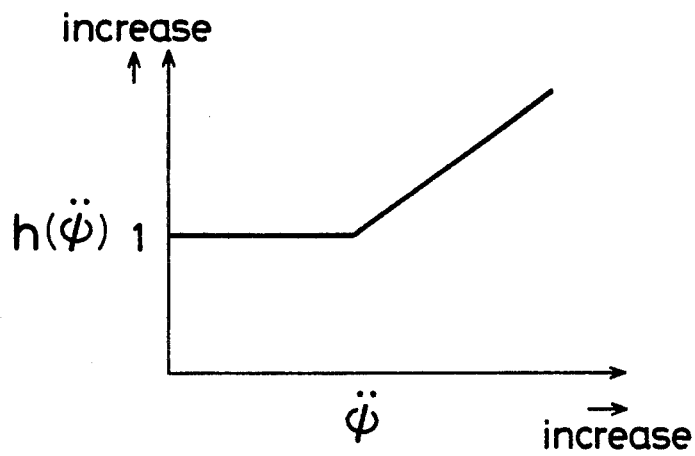
FIG. 15 shows the relation between $\ddot\psi$ and $h(\ddot\psi)$.
Figure 16:
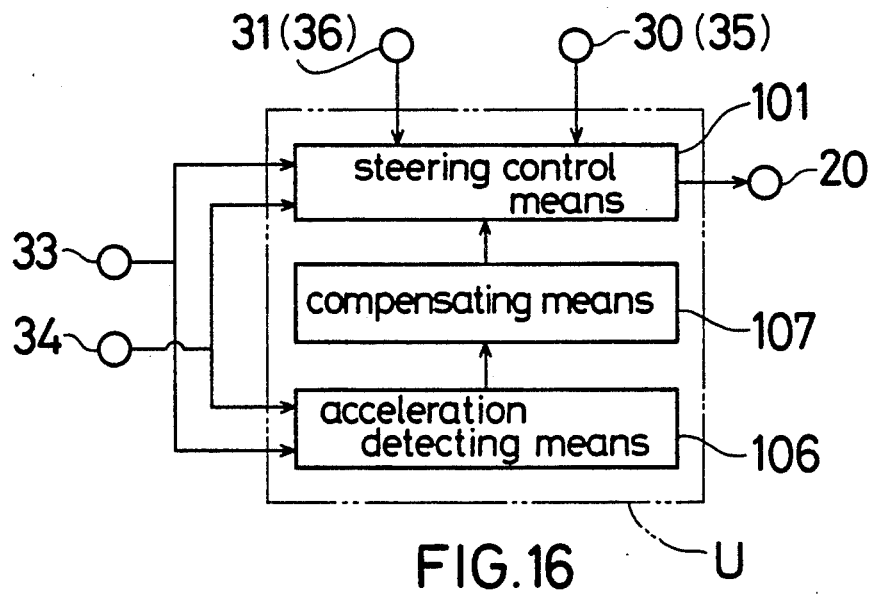
FIG. 16 is a block diagram showing a control unit in an another alternate embodiment.
Figure 17:
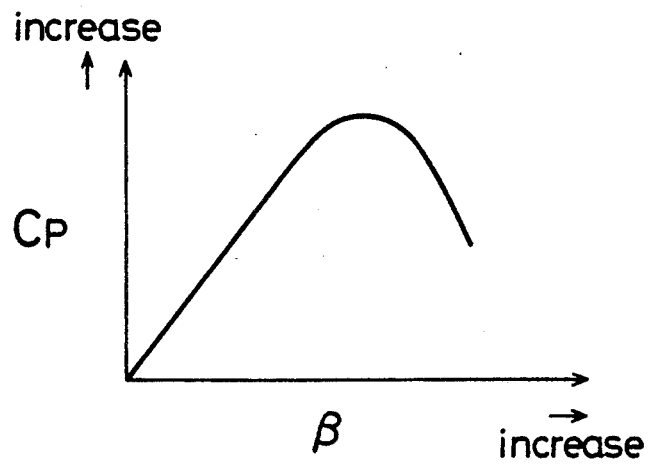
FIG. 17 is an explanatory drawing showing the relation between slip angle $\beta$ and cornering power.

The rear wheel steering may be controlled on the following formula:

$$TG\theta_R = -K_F \theta_F + K_R \cdot h(\ddot{\psi}) \cdot V \cdot \dot{\psi} \qquad (2)$$

where
$TG\theta_R$: target steering angle of rear wheel
$\theta_F$: steering angle of front wheel
V: vehicle speed
$\dot{\psi}$: yaw rate Although the coefficients $K_F$ and $K_R$ are the constants determined by the properties of the vehicle, they can be variables which will be changed in accordance with the vehicle speed. As shown in FIG. 15, $h(\ddot{\psi})$ is at 1 when the acceleration $\ddot{\psi}0$ is small. However, once the acceleration exceeds the certain rate, $h(\ddot{\psi})$ incrementally changes linearly.

For performing the above control, the control unit U comprises steering control means 101 for steering the rear wheel based on the above formula (2), acceleration detecting means 106 for detecting the change of the yaw rate (or lateral G), and compensating means 107 for compensating the steering angle of the rear wheels (target steering angle $TG\theta_R$ of the rear wheels) obtained from the steering control means 101 by increasing it by the fixed degree of steering angle toward the same direction as the front wheels when the acceleration (change of yaw rate, i.e. rate of change in the acceleration) sent from the acceleration detecting means 106 exceeds a certain value.

Accordingly, the acceleration detecting means 106 detects the change of yaw rate $\ddot{\psi}$ by receiving the signals from the lateral G sensors 33 and 34. When the change of the yaw rate $\ddot{\psi}$ exceeds the certain value, a function $h(\ddot{\psi})$ increases linearly (refer to FIG. 15). As a result, the value obtained in the formula (2) will be the compensation value that the target steering angle of the rear wheels determined by the formula (1) is increased by the fixed degree toward the same direction as the front wheels.

Thus, decrease in the cornering power due to increase in slip angle $\beta$ is restricted, thereby achieving slip angle $\beta = 0$ consistently.

When the change of yaw rate $\ddot{\psi}$ is not more than the fixed rate, the function $h(\ddot{\psi})=1$ (refer to FIG. 15). Therefore, the formula (2) will be identical to the formula (1), thus achieving slip angle $\beta=0$. In this way when the acceleration is larger than the fixed value, compensation is made so as to increase the steering angle of the rear wheel obtained by the steering control means of the rear wheels by the fixed degree toward the same direction as the front wheels.

In addition to the compensation using the function $h(\ddot{\psi})$, either ways of directly changing the degree of the rear wheel steering angle depending on the rate of yawing acceleration $\ddot{\psi}$ just increasing the element for guiding the rear wheels to the same direction as the front wheels when the value $\ddot{\psi}$ is not less than the fixed amount can be adopted.

In case of low friction coefficient of the road surface, it is preferable to set the change of the yaw rate smaller for the purpose of the stability. Further, since the problem occurs when the vehicle speed exceeds a certain rate, vehicle speed can be added as one of the factors which determine the degree of compensation.

As many apparently widely different embodiments of this invention may be made without departing from the spirit and scope thereof, it is to be understood that the present embodiment is &therefore illustrative and not restrictive. The scope of the invention is defined by the appended claims rather than by the description preceding them, and all changes that fall within meets and bounds of the claims, or equivalence of such meets and bounds are therefore intended to embraced by the claims.

What is claimed is:

1. A rear wheel steering device for a vehicle having steering control means for steering rear wheels in accordance with the formula, $$TG\theta_R = -K_F\theta_F + K_R \cdot V \cdot \dot{\psi}$$

where
 $TG\theta_R$: a target steering angle of the rear wheels
 $\theta_F$: a steering angle of the front wheels
 V: a vehicle speed
 $\dot{\psi}$: a yaw rate
 $K_F$, $K_R$: coefficients determined by the properties of the vehicle, comprising:
vehicle condition detecting means for detecting various conditions of the vehicle; and
changing means connected with said steering control means and said vehicle condition detecting means for changing at least one of the coefficients $K_F$, $K_R$ depending on the conditions of the vehicle.

2. A rear wheel steering device for a vehicle as defined in claim wherein said vehicle condition detecting means is connected with a vehicle speed sensor, and said changing means incrementally changes at least the coefficient $K_F$ between the coefficients $K_F$, $K_R$ with the increase in the vehicle speed V.

3. A rear wheel steering device for a vehicle as defined in claim wherein said vehicle condition detecting means detects the acceleration and deceleration of the vehicle, and said changing means decreases the coefficient $K_F$ or increases the coefficient $K_R$ depending on the acceleration or deceleration of the vehicle.

4. A rear wheel steering device for a vehicle defined in claim 1 further comprising vehicle state detecting means for detecting a presence of a predetermined state of the vehicle, and deleting means for commanding said steering control means to delete either the $K_F\theta_F$ term or the $K_R$, V, $\dot{\psi}$ term of said formula to carry out arithmetic operation on the remaining term of said formula when the output received from said vehicle state detecting means indicates the presence of the predetermined state of the vehicle.

5. A rear wheel steering device for a vehicle defined in claim 4 wherein said vehicle state detecting means is connected with acceleration and deceleration detecting means for detecting the state of the acceleration and deceleration of the vehicle, and said deleting means, at the time of the acceleration or deceleration, commands said steering control means to steer the rear wheels in accordance with the formula where the $K_F\theta_F$ term is deleted.

6. A rear wheel steering device for a vehicle as defined in claim 4 wherein said vehicle state detecting means is connected with a vehicle speed sensor which detects the speed of the vehicle, and said detecting means, at the time of a low speed, commands said steering control means to steer the rear wheels in accordance with the formula where the $K_r \cdot V \cdot \dot{\psi}$ term is deleted.

7. A rear wheel steering device for a vehicle as defined in claim 1 further comprising means for detecting the change of a yaw rate of the vehicle, and compensating means for increasing the rear wheel steering angle $TG\theta_R$ obtained from said steering control means by a fixed amount, wherein the rear wheels are turned in the same direction as the front wheels are turned in the same direction as the front wheels when the acceleration of the vehicle detected by the acceleration detecting means is larger than a predetermined value.

* * * * *